US007873797B2

(12) United States Patent
Niggemeier et al.

(10) Patent No.: US 7,873,797 B2
(45) Date of Patent: Jan. 18, 2011

(54) MEMORY CONTROLLER

(75) Inventors: Tim Niggemeier, Laatzen (DE);
Thomas Brune, Hannover (DE); Lothar Freissmann, Niedereschach (DE)

(73) Assignee: Thomson Licensing, Boulogne Billancourt (FR)

( * ) Notice: Subject to any disclaimer, the term of this patent is extended or adjusted under 35 U.S.C. 154(b) by 34 days.

(21) Appl. No.: 10/581,873

(22) PCT Filed: Nov. 15, 2004

(86) PCT No.: PCT/EP2004/012940

§ 371 (c)(1),
(2), (4) Date: Jun. 5, 2006

(87) PCT Pub. No.: WO2005/059764

PCT Pub. Date: Jun. 30, 2005

(65) Prior Publication Data

US 2007/0091696 A1 Apr. 26, 2007

(30) Foreign Application Priority Data

Dec. 9, 2003 (DE) ................................ 103 57 697
Feb. 24, 2004 (DE) ....................... 10 2004 009 428

(51) Int. Cl.
*G06F 12/00* (2006.01)
*G06F 13/00* (2006.01)
*G06F 13/28* (2006.01)

(52) U.S. Cl. ........................ 711/151; 711/158; 711/105

(58) Field of Classification Search .................. 711/158, 711/151, 105
See application file for complete search history.

(56) References Cited

U.S. PATENT DOCUMENTS

| 4,623,986 | A | | 11/1986 | Chauvel |
| 5,418,920 | A | * | 5/1995 | Kuddes ...................... 711/106 |
| 5,630,096 | A | * | 5/1997 | Zuravleff et al. ............ 711/154 |
| 6,046,952 | A | * | 4/2000 | Novak et al. ................ 365/222 |
| 6,301,642 | B1 | * | 10/2001 | Jones et al. ................. 711/151 |

(Continued)

FOREIGN PATENT DOCUMENTS

EP          0379436          7/1990

(Continued)

OTHER PUBLICATIONS

Search Report Dated Apr. 1, 2005.

*Primary Examiner*—Stephen C Elmore
*Assistant Examiner*—Mark A Giardino, Jr.
(74) *Attorney, Agent, or Firm*—Robert D. Shedd; Joseph J. Opalach; Reitseng Lin

(57) ABSTRACT

The present invention relates to a memory controller for an IC with an external DRAM, where the external DRAM has at least one memory bank and communicates with the IC via at least one channel. In line with the invention, the memory controller has a command scheduler which prioritizes the transmission of memory bank commands on the basis of a static priority allocation for commands and a dynamic priority allocation for channels.

14 Claims, 4 Drawing Sheets

U.S. PATENT DOCUMENTS

Figure 1:
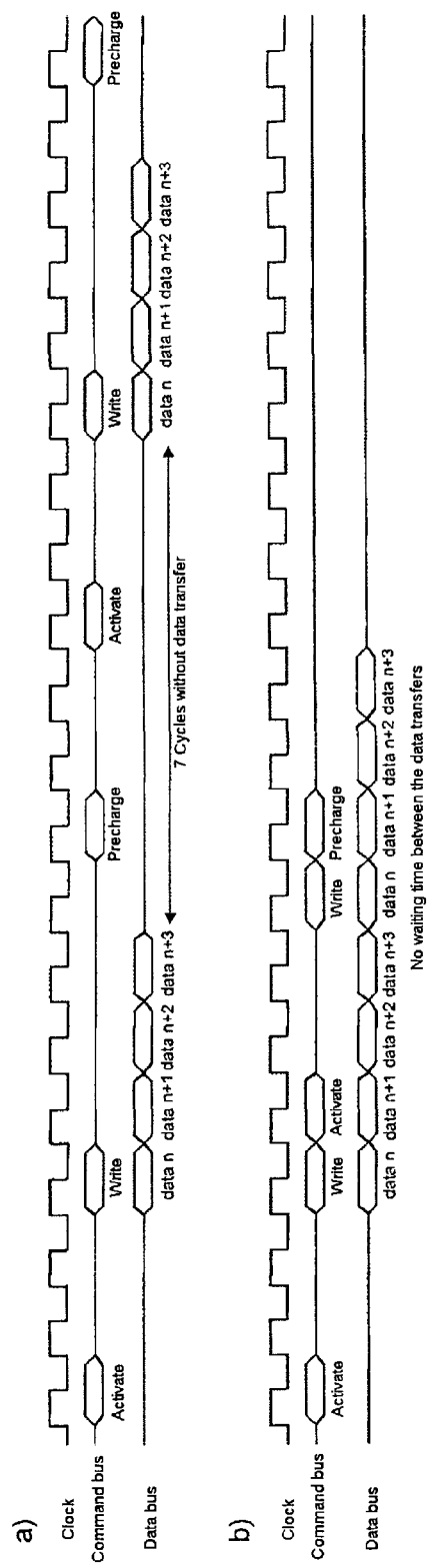

| | | | |
|---|---|---|---|
| 6,360,305 B1 * | 3/2002 | Novak et al. | 711/157 |
| 6,412,048 B1 * | 6/2002 | Chauvel et al. | 711/158 |
| 6,496,906 B1 * | 12/2002 | Novak et al. | 711/154 |
| 6,587,906 B2 | 7/2003 | Wolrich et al. | |
| 6,983,350 B1 * | 1/2006 | Wheeler et al. | 711/151 |
| 7,028,142 B2 * | 4/2006 | Mes | 711/137 |
| 2001/0044885 A1 * | 11/2001 | LaBerge | 711/158 |
| 2002/0040429 A1 * | 4/2002 | Dowling | 712/228 |
| 2002/0138687 A1 | 9/2002 | Yang et al. | |
| 2003/0033493 A1 | 2/2003 | Cismas | |
| 2003/0051108 A1 * | 3/2003 | Chen et al. | 711/158 |
| 2003/0061459 A1 | 3/2003 | Aboulenein et al. | |
| 2003/0105901 A1 | 6/2003 | Wolrich et al. | |
| 2004/0054844 A1 * | 3/2004 | Kirsch | 711/1 |

FOREIGN PATENT DOCUMENTS

| | | |
|---|---|---|
| EP | 1059589 | 12/2000 |
| GB | 2396442 A * | 6/2004 |

* cited by examiner

MEMORY CONTROLLER

This application claims the benefit, under 35 U.S.C. §365 of International Application PCT/EP04/012940, filed Nov. 15, 2004, which was published in accordance with PCT Article 21(2) on Jun. 30, 2005 in English and which claims the benefit of German patent application No. 10357697.5, filed Dec. 9, 2003.

The present invention relates to a memory controller for an IC with an external DRAM, particularly a memory controller with a command scheduler.

Statistics for the greatest sales of pre-recorded image data storage media in Germany show that the DVD replaced the video cassette for the first time last year. It can thus be assumed that in the foreseeable future DVD video recorders will replace analogue video recorders as a recording unit. Particularly digital television reception (DVB), which is currently spreading quickly, will also awaken the desire for digital storage. In this context, however, it has already been found that even modern compression methods such as MPEG-4 allow only two cinema films, on average, to be stored on a writeable DVD. As high-definition television (HDTV) progresses, the development of new optical storage media with a greater storage capacity is therefore being pushed ahead. An example of an optical storage medium of this type is the Blu-ray disc with a capacity of up to 54 GB. Future drives for optical storage media should preferably support at least the formats of Blu-ray disc, DVD and CD both for reading and for writing. To this end, an IC for controlling the optical drive is required which can handle said formats. In the field of image processing, too, e.g. in DVB receivers, powerful ICs are required.

To reduce the costs of digital end-consumer appliances, monolithic IC solutions ("one-chip solutions") are being used today, wherever this is possible. This means that embedded central processing units (CPUs) and/or digital signal processors (DSPs) are used instead of dedicated hardware in order to reduce the development time for the systems. To store instructions and data from these processors and to buffer the data stream from a drive or a video data stream, large memories of up to several megabytes are needed. To keep down the costs of the memory, DRAM (dynamic RAM) is normally used instead of SRAM (static RAM). Preferably, an SDRAM (synchronous DRAM) is used for the DRAM, or else other types of DRAM are used, such as DDR-RAM (double data rate RAM), ESDRAM (enhanced synchronous DRAM), SLDRAM (synchronous link DRAM) or RDRAM (Rambus DRAM). The text below refers either to DRAM generally or to SDRAM specifically. It goes without saying that the invention is not limited to the use of SDRAM.

Embedded DRAM is relatively expensive and IC processes which support embedded DRAM are rare. For this reason, external DRAM is normally used. To keep down the costs for the IC development, a limited number of pins are used, particularly in order to achieve a small physical size for the IC. On account of this limitation, the external data bus to the DRAM is often narrower than the internal data bus. This results in a bottleneck. In addition, the DRAM is used for storing a wide variety of data, i.e. it is used jointly by the available CPU DSP and real-time data streams. This aggravates the bottleneck additionally.

Typical SDRAM modules comprise four independent memory banks. Each memory bank comprises rows, which in turn comprise columns. In order to address a specific data value, the appropriate row in the appropriate memory bank first needs to be activated ('activate'). Following activation, which takes between two and four clock cycles, the data transfer can be initiated by transmitting a read or write command together with the desired column address. Following the data transfer, the memory bank is 'precharged' in order to deactivate the open row and to prepare the memory bank for the next activation command. 'Precharge' especially means that a memory address is already being prepared for access, because the system knows from the outset that a request to this address will be sent in the next clock cycles.

Normally, a burst transfer is used in order to read or write a plurality of data values using just a single read or write command. The access starts at a prescribed location (column) and is continued over a programmed number of locations. When a new burst has been initiated, the command bus is free and may be used for activating or precharging other memory banks.

The memory banks are thus controlled independently of one another, but share the same command lines. Only one command can therefore be sent in each clock cycle.

To manage with the smallest possible number of pins and a small physical size, the data throughput on the external data bus to the DRAM module needs to be maximized. A problem in this context is that the DRAM, as explained above using the example of SDRAM, requires a plurality of clock cycles for activating rows and for 'precharging' memory banks. This results in waiting times of several clock cycles between the data transfers. Depending on the length of the read or write bursts, these waiting times may result in more clock cycles remaining unused overall than clock cycles being used for the data transfer. An example of this is provided by FIG. 1a), which shows two write bursts over four respective clock cycles. Between the write bursts, there are seven clock cycles without any data transfer. To conceal the waiting times, the next data transfer already needs to be in preparation while a read or write burst is in progress. An example of this is shown in FIG. 1b), which likewise shows two write bursts over four respective clock cycles. The waiting times are concealed behind other data transfers.

It is known practice to eliminate the bottleneck by using a wider external data bus to the DRAM module or alternatively an embedded SRAM in order to reduce the workload on the external databus in this manner. Both solutions are relatively expensive to implement.

It is an object of the invention to propose a memory controller which allows a high data throughput with reduced waiting times and is inexpensive to implement.

The invention is explained below using the example of a single DRAM module. It is likewise possible to use a plurality of memory modules by connecting all memory modules to the same data bus and to the same command bus. In this case, a chip enable signal is used in order to select the desired module.

To use one or more DRAM modules jointly for a plurality of applications, it is necessary to ensure that the memory areas for the various processors and for the real-time data stream are physically separate. This means that all have one or more especially associated DRAM memory banks. This requirement may be dispensed with if it is ensured that no successive access operations to a jointly used memory bank arise.

In line with the invention, a method for communication between an IC and an external DRAM, where the external DRAM has at least two memory banks and communicates with the IC via at least one channel, involves the transmission of memory bank commands being prioritized on the basis of a static priority allocation for commands and a dynamic priority allocation for channels.

It is advantageous to the invention if the states of DRAM memory banks are depicted by associated state machines. This makes it possible to control all memory banks independently of one another. For each access operation, the state machines receive the type of transfer (read or write), the row number and the column number. By observing particular rules for time coordination, they control the memory banks by sending commands to the command scheduler. In this case, each channel is connected to the state machine which controls the associated memory bank. If a plurality of memory banks can be accessed via a channel, a network is required. The command scheduler ensures that the same memory bank is not addressed a plurality of times in succession. Between two access operations to a memory bank, an access operation to another memory bank is always effected. Alternatively, however, two successive access operations to a memory bank are permitted if they are made to the same row in the memory bank, which means that no waiting times arise as a result of the activation or precharging. The priority allocation sorts the pending commands according to their ability to start a new burst in such a way that optimum use of the DRAM data bus is achieved. This means that read and write commands have a high priority, followed by activation commands, which are a prerequisite for read or write commands. Precharging commands are given the lowest priority, since they are not part of the current transfer. Precharing commands are required only for successive transfers, and they can therefore be delayed. If all bursts have a length of four or more clock cycles, the workload on the command lines is small enough to transmit commands with low priority without a long delay. To stipulate the order of the waiting commands, the commands need to be analysed, grouped and sorted according to their ability to start a data transfer as quickly as possible:

| Command | Priority |
|---|---|
| Burst Terminate | 4 (highest) |
| Read or Write Burst | 3 |
| Activate | 2 |
| Precharge | 1 (lowest) |

The invention causes the DRAM module's bandwidth attained to be close to the physical maximum. With a large workload, the latencies are hidden entirely by Activate and Precharge, which means that the access times continue to be short. The demanding object of allowing access operations with low latency for some channels and of simultaneously ensuring a high data throughput for other channels is achieved very well by the inventive memory controller.

In line with a further aspect of the invention, a memory controller for an IC with an external DRAM, where the external DRAM has at least two memory banks and communicates with the IC via at least one channel, has a command scheduler which prioritizes the transmission of memory bank commands on the basis of a static priority allocation for commands and a dynamic priority allocation for channels.

Advantageously, an appliance for reading and/or writing to optical storage media has an inventive memory controller or uses an inventive method for communication between an IC and an external DRAM.

Figure 2:
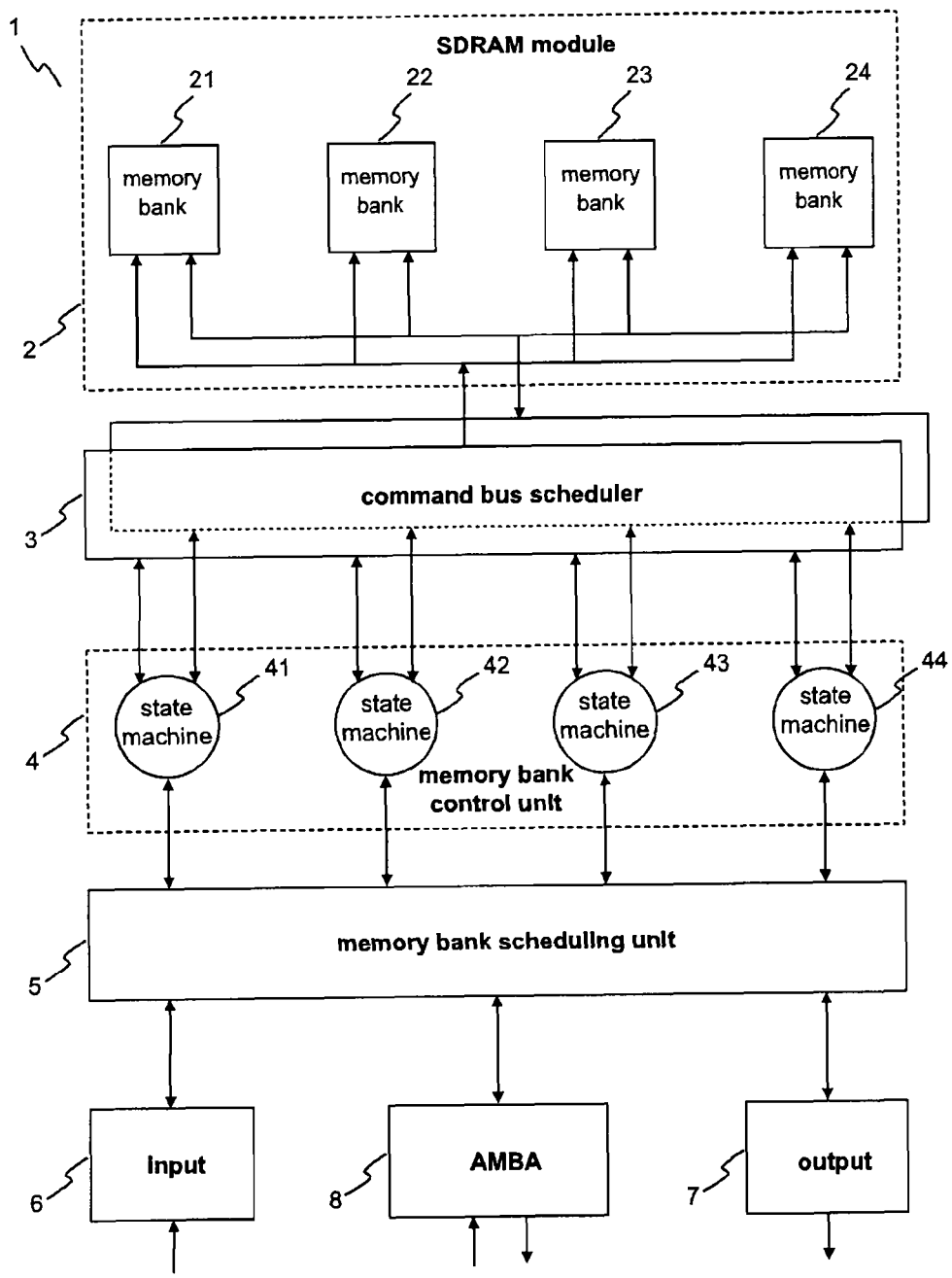
Figure 3:
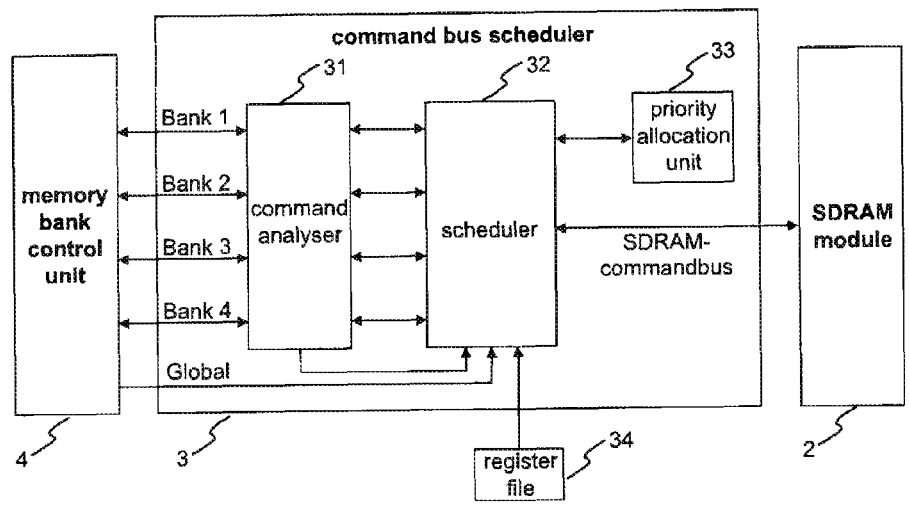
Figure 4:
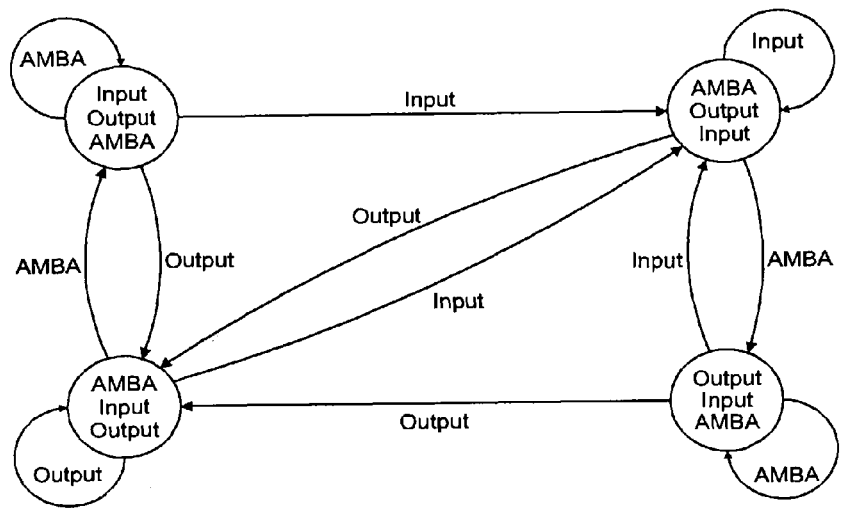
Figure 5:
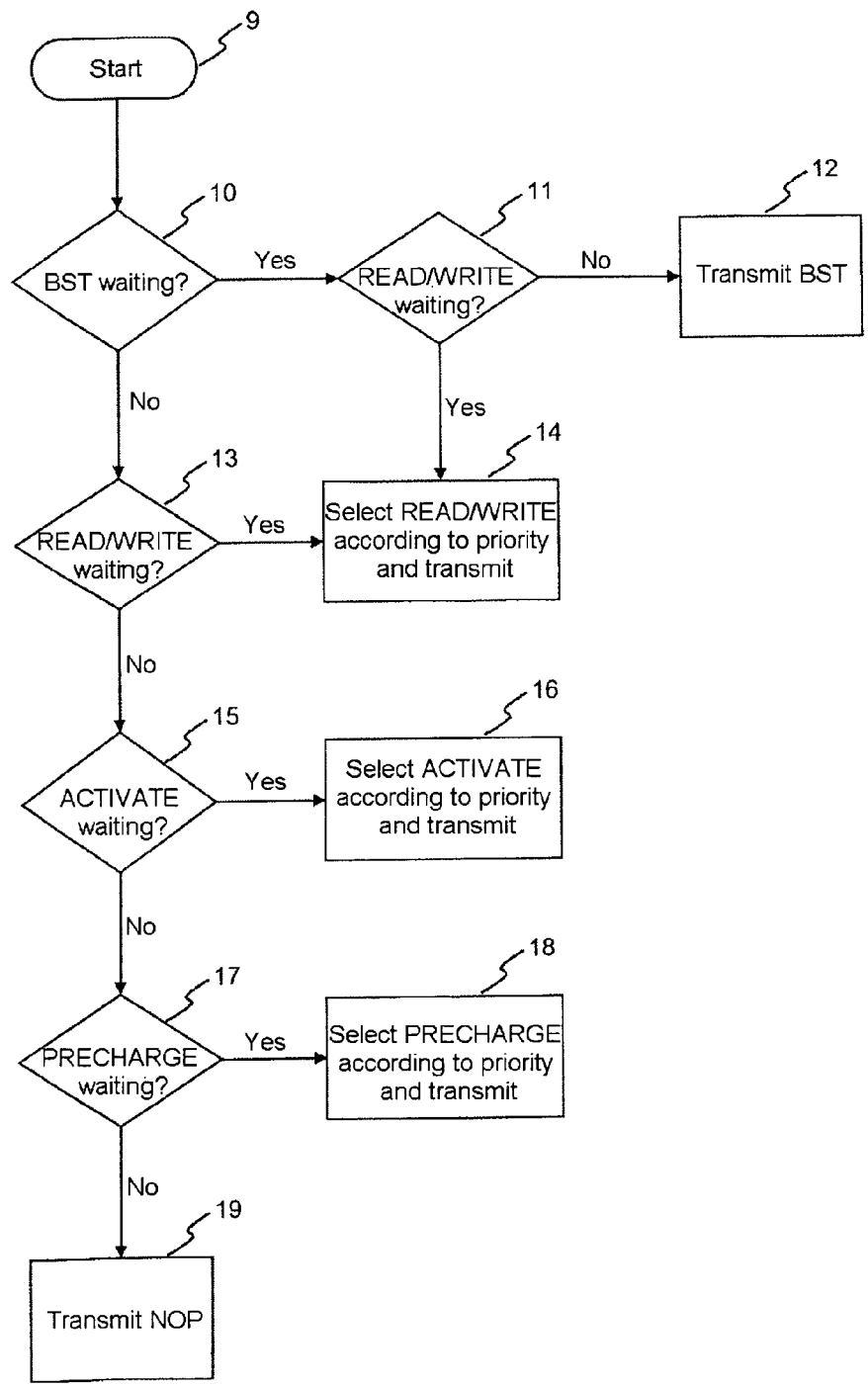

To improve understanding, the invention will be explained below with reference to FIGS. 1 to 5. In this case, identical reference symbols denote identical elements. It goes without saying that the invention is not limited to the exemplary embodiments shown. Features of the invention may readily be combined or modified without departing form the scope of validity of the invention. In the figures:

| | |
|---|---|
| FIG. 1 | shows two examples of two write bursts over four respective clock cycles; |
| FIG. 2 | shows the block diagram of an inventive memory controller; |
| FIG. 3 | shows the block diagram of a command scheduler; |
| FIG. 4 | shows a state diagram of the priority allocation; and |
| FIG. 5 | shows a flowchart for the command scheduler. |

FIG. 2 shows the block diagram of an inventive memory controller using the example of an SDRAM controller 1 in a system with three channels: an AMBA bus 8 for connecting a CPU, and also an input 6 and an output 7 for a real-time data stream. Each memory bank 21, 22, 23, 24 in the SDRAM module 2 has an associated state machine 41, 42, 43, 44 in a memory bank control unit 4, which depicts the respective state of the memory bank 21, 22, 23, 24 and is responsible for observing the waiting times and the correct state sequence. These state machines 41, 42, 43, 44 transmit their commands for the memory banks 21, 22, 23, 24 to a command scheduler 3 (command bus scheduler) which watches over the allocation of the external command and data bus. In each clock cycle, the command scheduler 3 transmits a command selected according to priority to the DRAM module 2. The state machines 41, 42, 43, 44 obtain their transfer orders directly via the three channels (input 6, AMBA 8 and output 7), which are forwarded by a memory bank scheduling unit 5 on the basis of their address and priority to the appropriate memory bank 21, 22, 23, 24. The memory bank scheduling unit 5 contains a network in order to allow all channels 6, 7, 8 to access all memory banks 21, 22, 23, 24. During a read access operation to the storage medium, the data from an ECC (Error Correction Code) unit (not shown) are accepted via the input channel 6, and the data are forwarded via the output channel 7 to an ATAPI block (not shown). Both channels 6, 7 contain FIFOs (not shown) in order to prevent the flow of data from being held up. During a write access operation to the storage medium, the data from the ATAPI block are received via the input channel 6, and are forwarded to the ECC unit via the output channel 7. An AMBA (Advanced Microcontroller Bus Architecture) slave, which is integrated in the AMBA channel 8, additionally permits access to a register file 34 as well (see FIG. 3). It contains a read cache and a write cache (not shown) in order to reduce the blocking time for the AMBA bus. Since the internal state of each of the four SDRAM memory banks 21, 22, 23, 24 is depicted by a separate state machine, merely accessing a state machine 41, 42, 43, 44 may result in competition by the three channels 6, 7, 8 which is not handled by an upstream scheduling algorithm. However, it is possible to ensure that this competition situation arises only rarely. For this reason, the real-time data stream of the sector data is granted priority over the AMBA access operations in this case.

A more detailed block diagram of the command scheduler 3 is shown in FIG. 3. The incoming commands from the state machines 41, 42, 43, 44 which manage the four memory banks 21, 22, 23, 24 are analysed by a command analyser 31. In this case, it is ascertained for each of the five possible commands—Activate, Read, Write, Precharge and Burst Terminate—whether it is present at least once. If this is the case, the first occurrence is sent to a scheduler 32. It is thus only relevant whether a command is waiting; the memory bank 21, 22, 23, 24 or the currently associated channel 6, 7, 8 is of no significance. The scheduler 32 has access to a register file 34 which contains particular operating parameters for the scheduler 32.

The scheduler 32 itself first checks the presence of a global command. If a command for programming the mode register, which contains the operating parameters DRAM, is present for a global refresh or a global precharge, then it is executed directly. Since the memory bank control unit 4 ensures that a global command can arise only when the memory banks 21, 22, 23, 24 are in the idle state, no further check is required here.

If the global command sent is an NOP (No Operation), then a memory bank command can be transmitted to the DRAM module 2. Memory bank commands are transmitted on the basis of a static priority allocation for commands and a dynamic priority allocation for channels 6, 7, 8, which are executed by a priority allocation unit 33. In this case, the priority of commands is higher than that of the channels 6, 7, 8. This means that first a command type is chosen and, if there are a plurality of channels 6, 7, 8 over which this command is sent, then the channel 6, 7, 8 is chosen, over which sending this command is allowed.

Among the commands, the Burst Terminate command for terminating bursts has the highest priority. The Read and Write commands have the second highest priority, since they initiate a new burst and sending them as quickly as possible is thus the prerequisite for a good utilisation level for the data bus. The next lowest priority is held by the Activate command, which is used for opening a row. Since the opening of a row is a prerequisite for starting a burst, the priority of the Activate command is above that of the Precharge command, which has the lowest priority, since it is executed after a burst has been terminated and, provided that no subsequent access is pending, does not influence the overall performance.

The dynamic prioritization of the channels 6, 7, 8 is effected by an algorithm as is shown in the form of a final state machine, i.e. a state diagram, in FIG. 4. The algorithm shown controls the access operations of a CPU via an AMBA-AHB (Advanced High-performance Bus) and a real-time data stream via its two channels (input and output). The states represent the priority levels. In this case, the channel shown in the top state has the highest priority and the bottom channel has the lowest priority. The state transitions represent the channel via which a read or write burst can be started. A possible additional channel for a flash controller, via which for example firmware etc. is sent, is not included, since it does not compete with the other channels.

As can be seen, the Input→AMBA→Output→AMBA sequence is always observed when all three channels are active. If no command can be sent via the channel with the highest priority since the channel is currently not active or the command to be sent has too low a priority, the channel via which a command can be sent is given the lowest priority in the next clock cycle. At the same time, however, it is ensured that the AMBA channel 8 is given the highest priority in the next clock cycle if it does not have the highest priority in the current clock cycle and another channel has an opportunity. Once the AMBA channel 8 has been given the highest priority, it loses it again only when a command was sent via the AMBA channel 8. This ensures the lowest possible latency for the ARM. The state diagram shown guarantees short delay times for the CPU access operations, since the AMBA channel 8 is given the highest priority after every burst via the input channel 6 or the output channel 7. In addition, the state diagram ensures fair use of the data bus and alternating access operations to the memory banks 21, 22, 23, 24. The algorithm is designed for CPU access operations with high priority and hence low latency given simultaneous guaranteed data throughput for the real-time data stream. The data throughput is stipulated by the length of the read and write bursts through the input channel 6 and the output channel 7 upon data transfer from and to the DRAM 2.

The decision regarding via which channel sending of a command is permitted will be explained below with reference to the flow chart shown in FIG. 5. If a memory bank FSM (Final State Machine) wishes to terminate its burst, this has the highest priority. If, consequently, a Burst Terminate (BST) has been found after the start 9 during the analysis 10, the burst in progress is aborted. This can be done in two ways: first by simply forwarding 12 the Burst Terminate command, secondly by starting 14 a new burst. Before a Burst Terminate is now sent, a check 11 is performed to determine whether a Read or Write command is likewise waiting to be sent. If this is the case, this command is sent 14 instead of the Burst Terminate. During the analysis, there is merely a check to determine whether at least one Read or Write command is present. For this reason, before the Read or Write command is sent 14, the dynamic priority allocation for the channels is used to check via which a Read or Write command is to be sent and has the highest priority. The command is then sent via this channel. The choice of channel is communicated to the priority allocation, which thus changes to a new state with a new distribution of priorities in the next clock cycle. The only restriction for replacement of the Burst Terminate command with a Read or Write command is that a Read Burst cannot be terminated by a Write Burst, since otherwise the memory controller 1 and the DRAM module 2 are driving the data bus simultaneously. When a lower clock frequency is used, this restriction can be bypassed, however, since the hold time for the outputs of the DRAM is constant and is not dependent on the clock frequency.

If no Burst Terminate command is present, then the presence of Read or Write commands is checked 13 and, if they are present, the command is transmitted 14 on the basis of the priority allocation. If no Read or Write commands are present either, then there is a check 15 for Activate commands. If an Activate command of this type is waiting, it is transmitted 16. If there is no Activate command, there is a check 17 for Precharge commands. Any Precharge command which is present is transmitted 18. Should no memory bank 21, 22, 23, 24 wish to send a command 19 and no command be sent via a channel 6, 7, 8, an NOP (No Operation) is transmitted. If a command is sent to the DRAM module 2, the memory bank FSM from which this command comes is informed by a signal, as a result of which it changes to a new state in the next clock cycle.

In order to observe the Set-up and Hold times of the DRAM module 2 when sending commands, the DRAM module 2 is preferably operated using an inverted system clock. The commands and the data for a Write access operation are thus accepted by the DRAM module 2 with a delay of half of one clock cycle plus the signal propagation time for the input and output drivers and the signals propagation time on the circuit board.

The invention claimed is:

1. A method for communication between an IC (integrated circuit) and an external RAM (random access memory), where the external RAM has at least one memory bank and communication between the IC and the external RAM is performed via two or more channels, at least one of the channels is one of a dedicated input and output channel, where data exchange between the IC and the external RAM necessitates at least two memory bank commands, the method comprising:

receiving the at least two memory bank commands via multiple channels;

prioritizing the at least two received memory bank commands on the basis of a static priority allocation; and further prioritizing the at least two commands having the same static priority on the basis of a dynamic priority allocation for the channels.

2. The method according to claim 1, wherein the prioritizing the at least two received memory bank commands on the basis of a static priority allocation includes: giving a 'Burst Terminate' command the highest priority, giving a 'Read' or 'Write' command the second highest priority, giving an 'Activate' command the third highest priority, and giving a 'Precharge' command the lowest priority.

3. The method according to claim 1, wherein the prioritizing the at least two commands having the same static priority on the basis of a dynamic priority allocation for the channels includes:

giving the lowest priority to a channel via which a command has been sent.

4. The method according to claim 1, wherein the prioritizing the at least two commands having the same static priority on the basis of a dynamic priority allocation for the channels includes:

giving one of the channels the highest priority in the next clock cycle if this channel does not have the highest priority in the current clock cycle and a command is sent via another channel.

5. The method according to claim 1, wherein the prioritizing the at least two commands having the same static priority on the basis of a dynamic priority allocation for the channels includes:

withdrawing the highest priority of a channel only when this channel can send a command.

6. The method according to claim 1, wherein the method further includes accessing physically separate memory areas in the external RAM via the channels.

7. The method according to claim 1, wherein the method further includes accessing jointly used memory areas in the external RAM via the channels and the assurance is given that no successive access operations to a jointly used memory area will arise.

8. The method according to claim 1, wherein the method further includes accessing various memory banks via at least one channel by a network.

9. The method according to claim 1, wherein the method further includes always having an access operation to another memory bank effected between two access operations to a memory bank.

10. The method according to claim 1, wherein the method further includes permitting two successive access operations to a memory bank when the access operations are made to the same row in the memory bank.

11. The method according to claim 1, wherein the method further includes depicting the states of the memory banks by associated state machines.

12. The method according to claim 1, wherein the method further includes using a plurality of RAM modules and receiving a chip enable signal in order to select the desired module.

13. A memory controller for an IC (integrated circuit) with an external RAM (random access memory), where the external RAM has at least one memory bank and communication between the IC and the external RAM is performed via two or more channels, at least one of the channels is one of a dedicated input and output channel, where data exchange between the IC and the external RAM necessitates at least two memory bank commands, the memory controller comprising: a command scheduler which prioritizes transmissions of the at least two memory bank commands of multiple channels on the basis of a static priority allocation for commands and the commands having the same priority are further prioritized by the command scheduler on the basis of a dynamic priority allocation for the channels.

14. An appliance for reading and/or writing to storage media, wherein the appliance comprising a memory controller utilizing the method according to claim 1.

* * * * *